Patented Apr. 24, 1928.

1,667,189

UNITED STATES PATENT OFFICE.

CHARLES E. BURKE AND HORACE H. HOPKINS, OF WILMINGTON, DELAWARE, ASSIGNORS TO E. I. DU PONT DE NEMOURS & COMPANY, OF WILMINGTON, DELAWARE, A CORPORATION OF DELAWARE.

SYNTHETIC RESIN.

No Drawing. Application filed April 28, 1927. Serial No. 187,411.

This invention relates to synthetic resins which are mixed esters of certain polyhydric alcohols, the acid components of which are dibasic acids and acids obtained by the hydrolysis of drying oils, with or without natural resin acids. More particularly, it relates to the mixed esters of pentaerythrite.

It is known that valuable synthetic resins may be obtained by preparing the mixed esters of polyhydric alcohols with polybasic acids and drying oil acids. These resins are described in detail in co-pending application of Hopkins & McDermott, Serial No. 129,286, filed August 14, 1926. The polyhydric alcohol most frequently used in the past is glycerin. The preparation of mixed esters of the higher alcohols has been accompanied with certain difficulties and the products obtained have not always been satisfactory.

It is an object of this invention to prepare synthetic resins of the mixed ester type which have greatly accelerated drying rates. It is a further object to obtain, by the use of such resins, harder and more print resistant films than could be obtained with prior compositions without sacrifice of flexibility and durability.

We have discovered that pentaerythrite can be esterified to form a mixed ester with polybasic acids and acids obtainable by the hydrolysis of drying oil, with or without the additional acids of natural resins.

The following are three typical resins, the compositions of which are given in molecular proportions and also in percentages:

|  | Mols. | Percentage. |
|---|---|---|
| Pentaerythrite | 3/4 | 18.5 |
| Phthalic anhydride | 1 | 26.8 |
| Linseed oil acids | 1 | 54.7 |
|  | | 100.0 |

|  | Mols. | Percentage. |
|---|---|---|
| Pentaerythrite | 3/4 | 18.5 |
| Phthalic anhydride | 1 | 26.8 |
| Linseed oil acids | 1/2 | 27.3 |
| Rosin | 1/2 | 27.4 |
|  | | 100.0 |

|  | Mols. | Percentage. |
|---|---|---|
| Pentaerythrite | 3/4 | 18.5 |
| Phthalic anhydride | 1 | 26.8 |
| Linseed oil acids | 1/2 | 27.3 |
| China wood oil acids | 1/2 | 27.4 |
|  | | 100.0 |

The components are combined in any suitable manner to form the final mixed ester. The following is one way in which the condensation may be carried out, but it is understood that the invention is not limited thereto.

The pentaerythrite, phthalic anhydride and the drying oil acids, with or without the natural resin acids, are heated together in any suitable reaction vessel. The heating is carried out, preferably, in the absence of air and this may be done by passing a stream of carbon dioxide through the vessel. The temperature of the mixture is gradually raised to the desired point, care being taken that the evolution of steam from the reaction mixture does not become so rapid as to cause loss of material by foaming, and temperatures of about 180–265° C. have been found suitable for carrying out the condensation. After about 7 to 10 hours, the reaction is substantially complete.

The pentaerythrite resins are highly valuable for many purposes and particularly for use in coating compositions since they are generally soluble in most of the common organic solvents. For certain purposes these resins possess specific advantages over the glycerin mixed ester type of resin. The pentaerythrite resins, when dissolved in suitable solvents and spread upon a surface, dry much faster and form harder and more print resistant films than are obtainable with the glycerin type resins. At the same time the pentaerythrite resin films have greater flexibility, durability and water resistance than the glycerin type of resins. Our resins become insoluble extremely rapidly at elevated temperatures and are, therefore, adapted for use in coatings where a rapid setup of the films is desired. Like the glycerin esters, our esters form substantially insoluble films on drying.

In place of the phthalic anhydride mentioned, we may use phthalic acid or other polybasic acids stable at the temperatures used, or we may use the anhydrides of these acids. For example, succinic acid, malic acid, maleic acid, fumaric acid, tartaric acid, citric acid and the like are suitable for use in making up the resins. By the term drying oil, we wish to designate any of that class of vegetable or animal oils having marked drying properties, such as linseed oil, perilla oil, soya bean oil, China wood oil, fish oil, and the like. We may use the drying oil acids obtainable by the hydrolysis of any of the raw drying oils, or heat-treated, or otherwise modified drying oils. The natural resins which we may use as components of our synthetic resins include those natural resins such as rosin, copal, Congo and fossil resins which are of an acidic nature and whose acid number is not substantially less than 50.

Suitable modifications may be made in carrying out the condensation operation for preparing the pentaerythrite resins. It is understood that our invention is not limited to the details described, but may be changed in many ways without departing from the spirit and scope of the invention, except as defined in the appending claims.

We claim:

1. The process of producing a synthetic resin which comprises heating to reaction temperature a reaction mass containing pentaerythrite, a polybasic acid and a drying oil acid.

2. The process of producing a synthetic resin which comprises heating to reaction temperature a reaction mass containing pentaerythrite, a polybasic acid, a drying oil acid and a natural resin.

3. The process of producing a synthetic resin which comprises heating to a temperature of 180–265° C. a reaction mixture containing pentaerythrite, a polybasic acid and a drying oil acid, the heating being continued until the evolution of water vapor has substantially ceased.

4. The process of producing a synthetic resin which comprises heating to reaction temperature a reaction mass containing pentaerythrite, phthalic acid and a drying oil acid.

5. The process of producing a synthetic resin which comprises heating to reaction temperature a reaction mass containing pentaerythrite, phthalic acid and a linseed oil acid.

6. The process of producing a synthetic resin which comprises heating to reaction temperature a reaction mass containing pentaerythrite, phthalic acid, a linseed oil acid and rosin.

7. A new composition of matter comprising a mixed ester of pentaerythrite, the acid radicals of which are those of a polybasic acid and a drying oil acid.

8. A new composition of matter comprising a mixed ester of pentaerythrite, the acid radicals of which are those of a polybasic acid, a drying oil acid and a natural resin acid.

9. A new composition of matter comprising a mixed ester of pentaerythrite, the acid radicals of which are those of phthalic acid and a drying oil acid.

10. A new composition of matter comprising a mixed ester of pentaerythrite, the acid radicals of which are those of phthalic acid and a linseed oil acid.

11. A new composition of matter comprising a mixed ester of pentaerythrite, the acid radicals of which are those of phthalic acid, linseed oil acid and rosin acid.

In testimony whereof we affix our signatures.

CHARLES E. BURKE.
HORACE H. HOPKINS.